United States Patent
Benjamin et al.

(10) Patent No.: US 10,901,569 B2
(45) Date of Patent: Jan. 26, 2021

(54) INTEGRATION OF TOOLS

(71) Applicant: Walmart Apollo, LLC, Bentonville, AR (US)

(72) Inventors: Seth Benjamin, Oceanside, CA (US); Adam J. Wand, Carlsbad, CA (US); Maxime Najim, Carlsbad, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 280 days.

(21) Appl. No.: 15/883,035

(22) Filed: Jan. 29, 2018

(65) Prior Publication Data

US 2019/0235704 A1    Aug. 1, 2019

(51) Int. Cl.
   *G06F 3/0483*    (2013.01)
   *G06F 3/0481*    (2013.01)
   *G06F 9/451*    (2018.01)

(52) U.S. Cl.
   CPC .......... *G06F 3/0481* (2013.01); *G06F 3/0483* (2013.01); *G06F 9/451* (2018.02)

(58) Field of Classification Search
   CPC ....... G06F 9/451; G06F 3/0481; G06F 3/0483
   See application file for complete search history.

(56) References Cited

U.S. PATENT DOCUMENTS

2006/0179067 A1* 8/2006 Bechtel ............... G06F 16/9038
2008/0281610 A1* 11/2008 Yoshida ................ G06Q 30/02
                                                            705/1.1

* cited by examiner

*Primary Examiner* — Andrea C Leggett
(74) *Attorney, Agent, or Firm* — Duane Morris LLP; Manita Rawat

(57) ABSTRACT

Systems and methods of providing an integrated interface for generating one or more pages of a network interface are disclosed. A system includes a computing device configured to generate an integrated page including a first element associated with a first tool. The first element is configured to present one or more components on the integrated page. A modification of the first element is received by the computing device and a first parameter is extracted from the first element. The first parameter is defined by the first tool. A first tool-specific call is generated for the first tool. The first tool-specific call includes the first parameter. A structure of the first tool-specific call is defined by the first tool.

20 Claims, 7 Drawing Sheets

INTEGRATION OF TOOLS

TECHNICAL FIELD

This application relates generally to management tools for user interfaces and, more particularly, to integrating disparate management tools for user interfaces.

BACKGROUND

Generation and presentation of user interfaces is essential for ensuring user engagement and achieving targeted metrics. When designing a user interface, it is necessary to compare position, interaction, operation, and other factors of several elements simultaneously to determine the overall feel and flow of the interface. Each of the presented elements can be associated with and/or managed by one or more of a plurality of disparate tools each requiring input and interaction.

Current systems require a user to individually interact with each tool associated with an element on a page. For example, if a first element is associated with a first tool and a second element is associated with a second tool, a user must enter data for the first element in a first interface associated with the first tool and enter data for the second element in a second interface associated with the second tool. Tool interfaces are tool specific and do not provide any information regarding how elements selected in the tool interface may interact with other elements of a user interface. Current systems fail to provide necessary information for building complete user interfaces in an intuitive manner.

SUMMARY OF THE INVENTION

In various embodiments, a system including a computing device is disclosed. The computing device is configured to generate an integrated page including a first element associated with a first tool. The first element is configured to present one or more components on the integrated page. A modification of the first element is received by the computing device and a first parameter is extracted from the first element. The first parameter is defined by the first tool. A first tool-specific call is generated for the first tool. The first tool-specific call includes the first parameter. A structure of the first tool-specific call is defined by the first tool.

In various embodiments, a non-transitory computer readable medium having instructions stored thereon is disclosed. The instructions, when executed by a processor cause a device to perform operations including generating an integrated page including a first element associated with a first tool. The first element is configured to present one or more components on the integrated page. A modification of the first element is received by the device and a first parameter is extracted from the first element. The first parameter is defined by the first tool. A first tool-specific call is generated for the first tool by the device. The first tool-specific call includes the first parameter and a structure of the first tool-specific call is defined by the first tool.

In various embodiments, a method is disclosed. The method includes the step of generating an integrated page including a first element associated with a first tool. The first element is configured to present one or more components on the integrated page. A modification of the first element is received and a first parameter is extracted from the first element. The first parameter is defined by the first tool. A first tool-specific call is generated for the first tool. The first tool-specific call includes the first parameter and a structure of the first tool-specific call is defined by the first tool.

BRIEF DESCRIPTION OF THE DRAWINGS

The features and advantages will be more fully disclosed in, or rendered obvious by the following detailed description of the preferred embodiments, which are to be considered together with the accompanying drawings wherein like numbers refer to like parts and further wherein.

DETAILED DESCRIPTION

The ensuing description provides preferred exemplary embodiment(s) only and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes can be made in the function and arrangement of elements without departing from the spirit and scope as set forth in the appended claims.

In various embodiments, systems and methods of providing an integrated interface are disclosed. The integrated interface generates an integrated interface page including a plurality of elements each associated with one or more tools. Each of the tools includes a tool-specific interface configured to receive one or more parameters associated with the tool. Each of the plurality of elements on the integrated interface page are configured to receive input from a user. The input can include any suitable type, such as text, graphics, commands, position information, etc. When input is received within one of the plurality of elements, the integrated interface page generates tool-specific commands and/or inputs for tool-specific interfaces for each tool associated with an element. The integrated curation interface extracts tool-specific information and formats the extracted parameters for the tool-specific interfaces.

Figure 1:
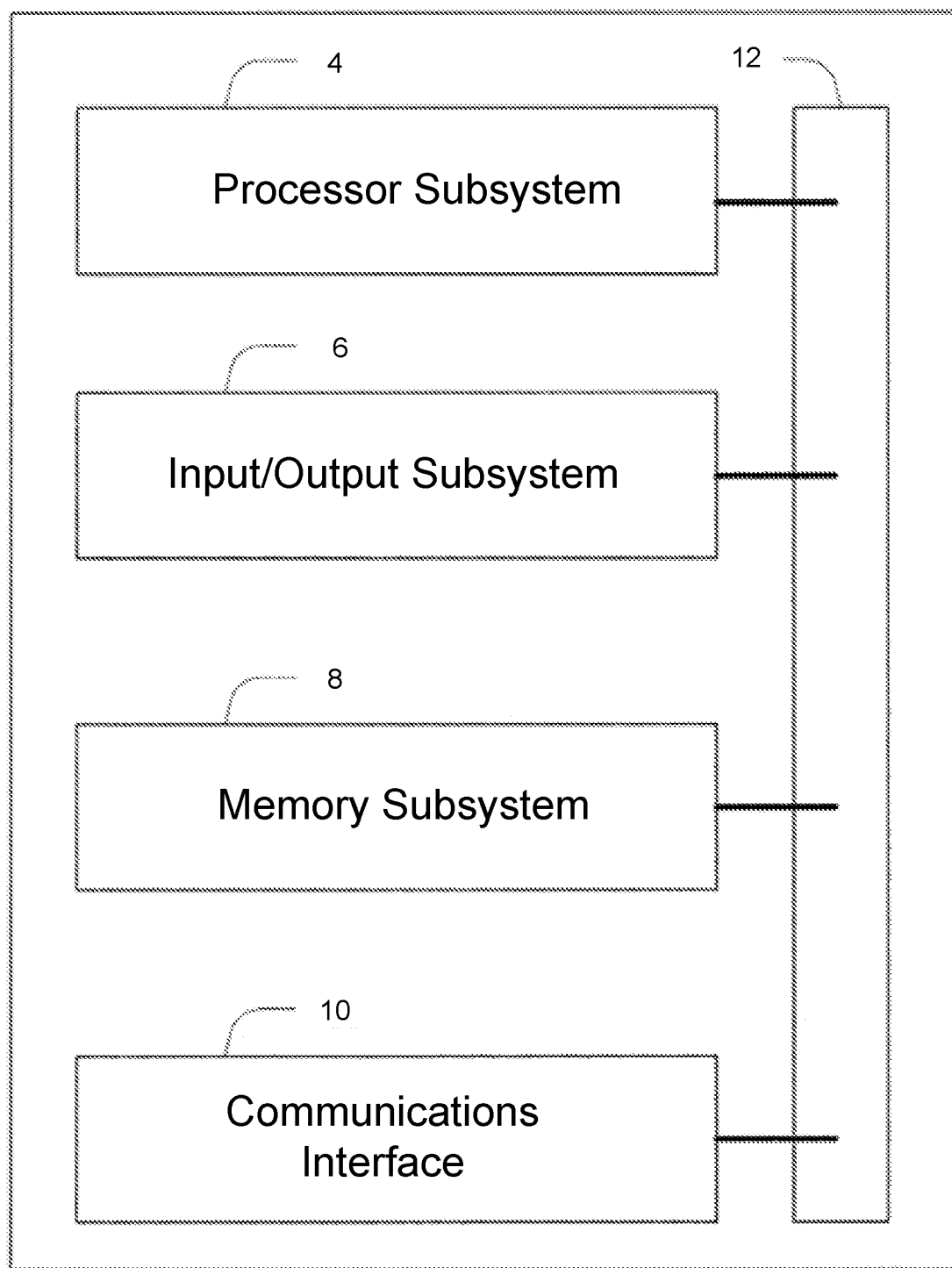
FIG. 1 illustrates a block diagram of a computer system, in accordance with some embodiments.

FIG. 1 illustrates a computer system configured to implement one or more processes, in accordance with some embodiments. The system 2 is a representative device and may comprise a processor subsystem 4, an input/output subsystem 6, a memory subsystem 8, a communications interface 10, and a system bus 12. In some embodiments, one or more than one of the system 4 components may be combined or omitted such as, for example, not including a input/output subsystem 6. In some embodiments, the system 2 may comprise other components not combined or comprised in those shown in FIG. 1. For example, the system 2 may also include, for example, a power subsystem. In other embodiments, the system 2 may include several instances of the components shown in FIG. 1. For example, the system 2 may include multiple memory subsystems 8. For the sake of conciseness and clarity, and not limitation, one of each of the components is shown in FIG. 1.

The processor subsystem 4 may include any processing circuitry operative to control the operations and performance of the system 2. In various aspects, the processor subsystem 4 may be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 4 also may be implemented by a controller, a microcontroller, an application specific integrated circuit (ASIC), a field programmable gate array (FPGA), a programmable logic device (PLD), and so forth.

In various aspects, the processor subsystem 4 may be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications comprise, for example, network applications, local applications, data input/output applications, user interaction applications, etc.

In some embodiments, the system 2 may comprise a system bus 12 that couples various system components including the processing subsystem 4, the input/output subsystem 6, and the memory subsystem 8. The system bus 12 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCMCIA), Small Computers Interface (SCSI) or other proprietary bus, or any custom bus suitable for computing device applications.

In some embodiments, the input/output subsystem 6 may include any suitable mechanism or component to enable a user to provide input to system 2 and the system 2 to provide output to the user. For example, the input/output subsystem 6 may include any suitable input mechanism, including but not limited to, a button, keypad, keyboard, click wheel, touch screen, motion sensor, microphone, camera, etc.

In some embodiments, the input/output subsystem 6 may include a visual peripheral output device for providing a display visible to the user. For example, the visual peripheral output device may include a screen such as, for example, a Liquid Crystal Display (LCD) screen. As another example, the visual peripheral output device may include a movable display or projecting system for providing a display of content on a surface remote from the system 2. In some embodiments, the visual peripheral output device can include a coder/decoder, also known as Codecs, to convert digital media data into analog signals. For example, the visual peripheral output device may include video Codecs, audio Codecs, or any other suitable type of Codec.

The visual peripheral output device may include display drivers, circuitry for driving display drivers, or both. The visual peripheral output device may be operative to display content under the direction of the processor subsystem 6. For example, the visual peripheral output device may be able to play media playback information, application screens for application implemented on the system 2, information regarding ongoing communications operations, information regarding incoming communications requests, or device operation screens, to name only a few.

In some embodiments, the communications interface 10 may include any suitable hardware, software, or combination of hardware and software that is capable of coupling the system 2 to one or more networks and/or additional devices. The communications interface 10 may be arranged to operate with any suitable technique for controlling information signals using a desired set of communications protocols, services or operating procedures. The communications interface 10 may comprise the appropriate physical connectors to connect with a corresponding communications medium, whether wired or wireless.

Vehicles of communication comprise a network. In various aspects, the network may comprise local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes comprise any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes comprise any mode of communication between points that utilize wired technology including various protocols and combinations of protocols associated with wired transmission, data, and devices. The points comprise, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules may communicate in accordance with a number of wired protocols. Examples of wired protocols may comprise Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 10 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 10 may comprise a wireless interface comprising one or more antennas, transmitters, receivers, transceivers, amplifiers, filters, control logic, and so forth.

In various aspects, the communications interface 10 may provide data communications functionality in accordance with a number of protocols. Examples of protocols may comprise various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may comprise various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols may comprise wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may comprise near-field communication techniques and protocols, such as electro-magnetic induction (EMI) techniques. An example of EMI techniques may comprise passive or active radio-frequency identification (RFID) protocols and devices. Other suitable protocols may comprise Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 8.

In some embodiments, the memory subsystem 8 may comprise any machine-readable or computer-readable media capable of storing data, including both volatile/non-volatile memory and removable/non-removable memory. The memory subsystem 8 may comprise at least one non-volatile memory unit. The non-volatile memory unit is capable of storing one or more software programs. The software programs may contain, for example, applications, user data, device data, and/or configuration data, or combinations therefore, to name only a few. The software programs may contain instructions executable by the various components of the system 2.

In various aspects, the memory subsystem 8 may comprise any machine-readable or computer-readable media capable of storing data, including both volatile/non-volatile memory and removable/non-removable memory. For example, memory may comprise read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 8 may contain an instruction set, in the form of a file for executing various methods, such as methods for implementing an integrated interface, as described herein. The instruction set may be stored in any acceptable form of machine readable instructions, including source code or various appropriate programming languages. Some examples of programming languages that may be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 4.

Figure 2:
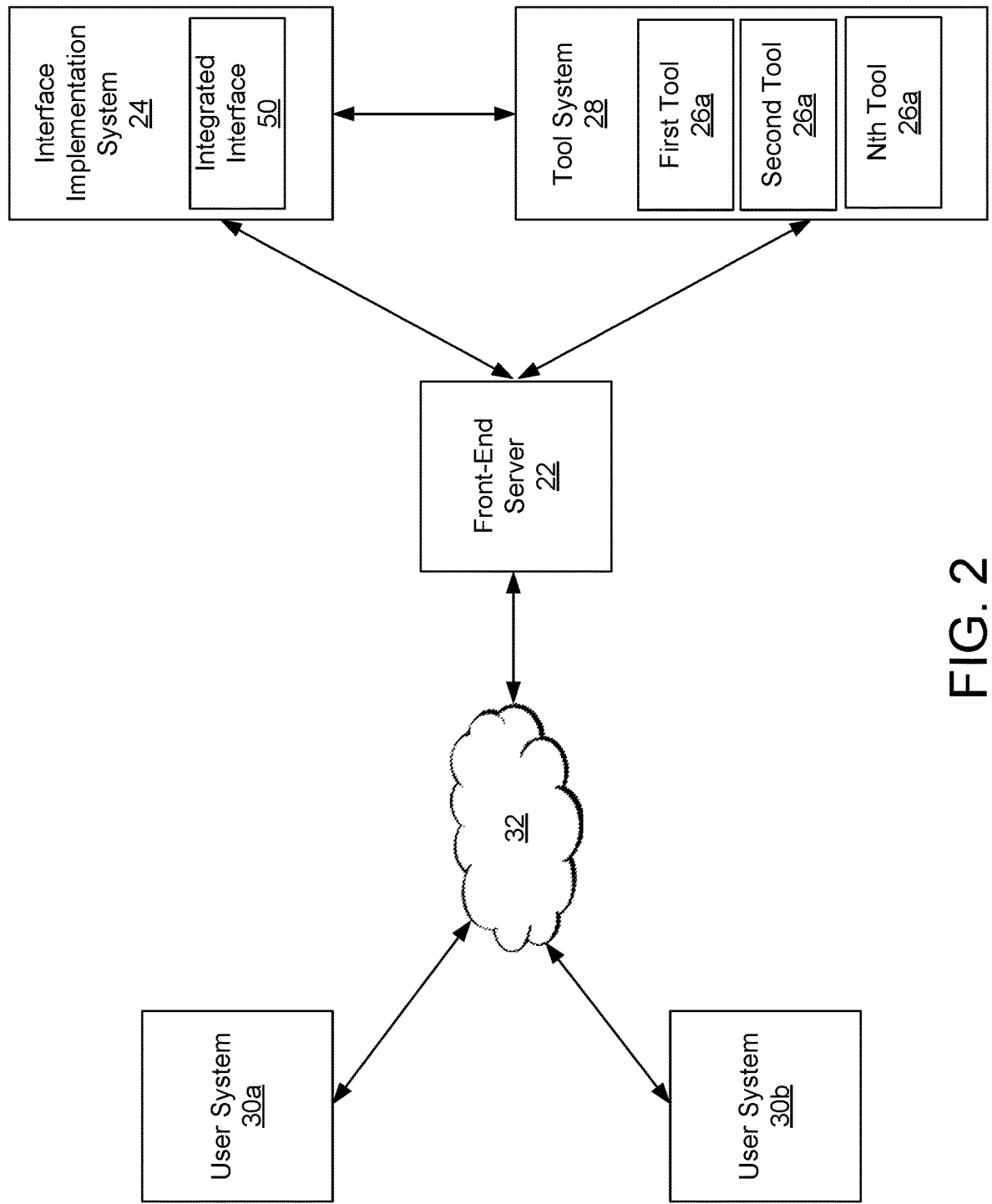
FIG. 2 illustrates a network environment including a plurality of tools configured to provide one or more elements to a user interface, in accordance with some embodiments.

FIG. 2 illustrates a network 20 including a front-end system 22, an interface implementation system 24, a plurality of tools 26a-26c implemented by one or more tool systems 28, and a plurality of user systems 30a, 30b. Each of the systems 22-30b can include a system as described above with respect to FIG. 1, and similar description is not repeated herein. Although the systems are each illustrated as independent systems, it will be appreciated that each of the systems may be combined, separated, and/or integrated into one or more additional systems. For example, in some embodiments, each of the plurality of tools 26a-26c is provided by a separate tool system. Similarly, the user systems 30a, 30b may be integrated into additional user systems, such as networked system or server in a user environment.

In some embodiments, the front-end system 22 is configured to provide one or more network interfaces to one or more user systems 30a, 30b. For example, the front-end system 22 may be configured to provide a webpage, a web portal, an application (e.g., mobile, desktop, etc.), and/or other network access interface to each of the user systems 30a, 30b. As one example, in some embodiments, the front-end system 22 is configured to provide a webpage having an e-commerce interface for identifying and purchasing one or more goods, although it will be appreciated that the disclosed systems and methods can be applied to any suitable front-end system 22 configured to provide a user interface. In some embodiments, the front-end system 22 includes a front-end webserver, although it will be appreciated that the front-end system 22 can include any suitable front-end system.

In some embodiments, the front-end system 22 is configured to provide a network interface including one or more pages. The term "page" is used herein to refer to specific portions of the network interface, including, but not limited to, one or more static interfaces (e.g., webpages, files, etc.), one or more dynamic interfaces (e.g., graphical user interface, video interface, virtual reality interface, etc.), and/or any other suitable interface. Each page includes one or more elements provided to a user system 30a, 30b, for example, for presentation to a user, for processing, etc. As used herein, the term "element" can refer to any content included in a page, including, but not limited to, presentation content (e.g., text, figures, backgrounds, colors, etc.), processing content (e.g., non-user visible code, executables, etc.), passive content (e.g., sensors, loggers, etc.), and/or any other suitable content.

In some embodiments, an interface implementation system 24 is configured to receive one or more inputs for generating a user interface. The inputs can include content, instructions, and/or other inputs for implementing, presenting, and/or providing a user interface to one or more user systems 30a, 30b. In some embodiments, the interface implementation system 24 is configured to provide a curation interface configured to allow a user to generate, review, and/or edit one or more user interfaces for presentation by the front-end system 22. The curation interface can include one or more elements configured to interface with one or more tools, as discussed in greater detail below.

In some embodiments, a plurality of tools 26a-26c are provided by at least one tool system 28. The plurality of tools 26a-26c are configured to perform one or more functions with respect to the network interface provided by the front-end system 22. For example, in various embodiments, each of the plurality of tools 26a-26c is configured to provide one or more of content, processing instructions, resource responses, query responses, applications, databases, and/or any other suitable resource required by the network interface. Each of the tools 26a-26c is configured to receive input from and/or generate output to a network interface implemented by the front-end system 22.

In some embodiments, each of the plurality of tools 26a-26c includes a tool-specific interface, such as an application programming interface (API), a text interface, and/or other suitable interface. The tool-specific interface provided by each of the plurality of tools 26a-26c is configured to receive one or more parameters for configuring the tool. For example, in some embodiments, a first tool 26a includes a first API configured to receive input for one or more elements presented on a network interface and generate one or more outputs for display through one or more elements presented on the network interface and a second tool includes a second API for identifying a path of one or more content items to be presented on the network interface. It will be appreciated that any suitable tool-specific interface configured to receive tool-defined parameters can be provided by each of the plurality of tools 26a-26c.

In some embodiments, the interface implementation system 24 is configured to extract tool-specific parameters from each element and provide the extracted parameters to an associated tool 26a-26c. In traditional systems, a user must interact with each individual tool-specific interface provided by each of the plurality of tools 26a-26c for each element associated with the tool 26a-26c. Each tool 26a-26c requires a specific set of parameters to be defined and/or provided within the tool-specific interface to configure or enable the tool for the associated page. In many cases, tool-specific interfaces are redundant, cumbersome, and/or user unfriendly.

To overcome the deficiencies of traditional system, in some embodiments, the interface implementation system 24 provides an integrated interface 50 configured to provide a single, integrated input source for implementing and/or configuring a network interface page. As discussed in greater detail below with respect to FIG. 3, the integrated interface provides a plurality of elements in a single integrated environment, such as an integrated interface page. Each of the plurality of elements is configured to receive a input from a user. The interface implementation system 24 is configured to extract tool-specific parameters from each element and generate tool-specific calls for each tool associated with the selected element. The interface implementation system 24 automatically extracts tool-specific parameters from the input and/or parameters associated with the integrated interface page.

Figure 3:
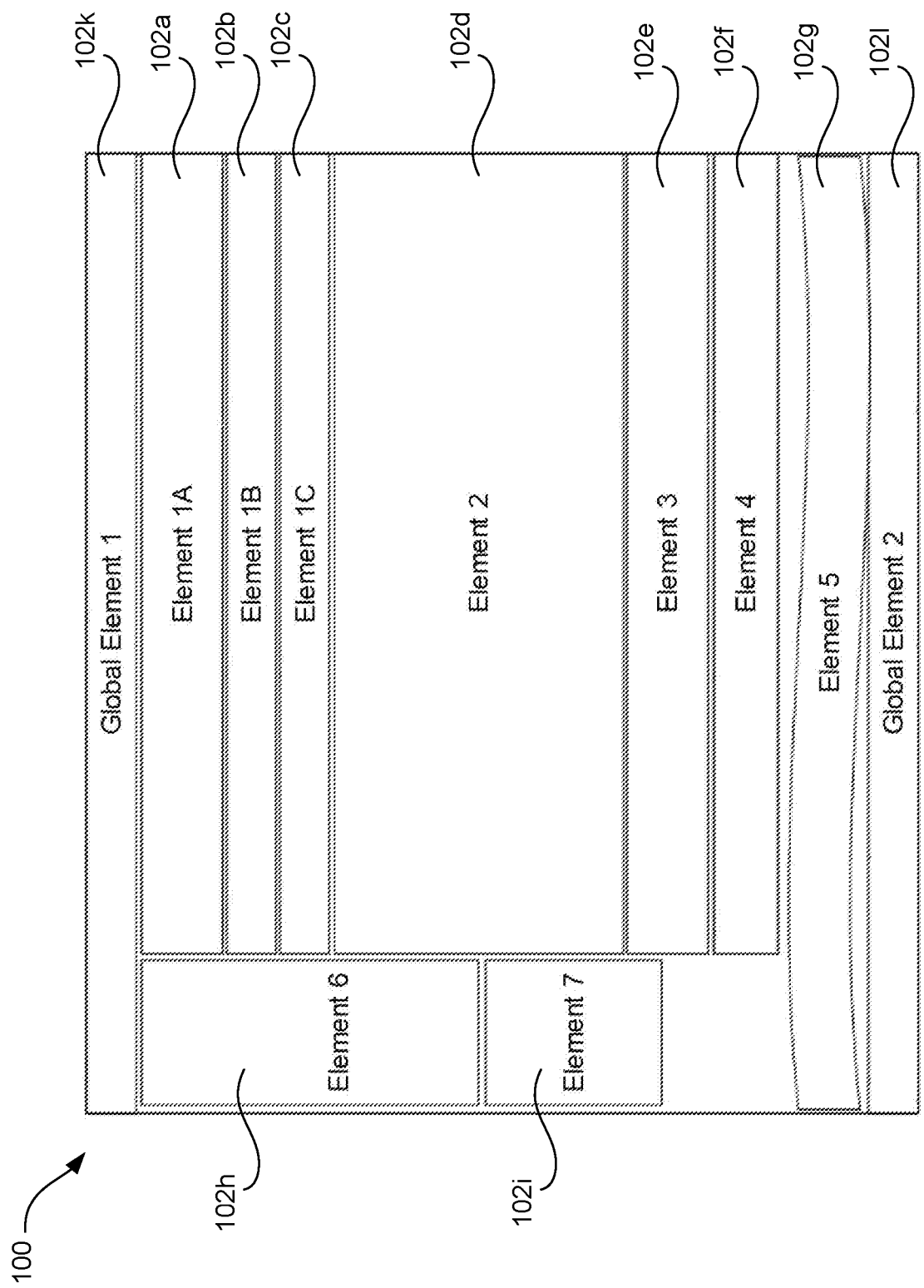
FIG. 3 illustrates an integrated interface page provided by an integrated interface and including one or more of the elements associated with the plurality of tools illustrated in FIG. 2, in accordance with some embodiments.

FIG. 3 illustrates an integrated interface page 100 (referred to herein interchangeably as "page 100") presented by an integrated interface 50 including elements 102a-102l, in accordance with some embodiments. Each of the elements 102a-102l are associated with one or more of a plurality of tools 26a-26c provided by the tool system 28. For example, in one embodiment, the page 100 is representative of a page provided in a web environment implemented by the front-end server 22, such as an e-commerce environment. Although embodiments are discussed herein including a page from a web environment, it will be appreciated that any suitable network interface can be represented and/or implemented by the integrated interface 50. The presented elements 102a-102l can include page specific elements 102a-102i and/or global elements 102k-102l shared across pages in a network interface.

Each of the elements 102a-102l is configured to receive user input. For example, in some embodiments, each of the elements 102a-102l can be selected by a user system 30a, 30b. When an element 102a-102l is selected, the integrated interface 50 configures the page 100 to receive input from the user. For example, in some embodiments, each element 102a-102l includes a fillable-form and/or other interactive element that allows a user to enter and/or position content elements (such as text, graphics, banners, etc.), command elements, hidden elements, etc. Content and other input provided to an element 102a-102l is reviewed by the integrated interface 50 to extract one or more tool-specific parameters from the input. The integrated interface 50 generates a tool-specific call to update and/or configure each tool associated with a selected element. Each tool-specific call includes one or more extracted parameters associated with the tool.

In some embodiments, each of the elements 102a-102l are associated with a specific set of available tools 26a-26c. For example, in some embodiments, each tool 26a-26c is associated (or registered) with one or more of the elements 102a-102l included on the page 100. When input is provided to an element 102a-102l through the integrated interface page 100, the integrated interface 50 tool-specific parameters for each of the tools 26a-26c associated with the element 102a-102l. The integrated interface 50 generates a tool-specific call for each of the tool-specific interfaces of each associated tool 26a-26c. The tool-specific call provides the tool-specific parameters to each of the tools 26a-26c in a structure (or format) defined by the associated tool 26a-26c. The tool-specific call integrates and/or configures the tools 26a-26c based on the input to the selected element 102a-102l.

In some embodiments, two or more of the elements 102a-102l are associated with a single tool. For example, in some embodiments, a first element 102a, a second element 102b, and a third element 102c are each associated with a tool 26a configured to provide page-specific content. A user can interact with the first element 102a to insert a graphic, interact with the second element 102b to insert text, and interact with a third element 102c to position an interactive element. In order to present a final version of the page 100, the first tool 26a is configured for each of the graphic, text, and interactive element. The integrated interface 50 extracts parameters identified by the first tool 26a for each of the first element 102a, the second element 102b, and the third element 102c and automatically generates a one or more tool-specific calls for the first tool 26a for each of the first, second, and third element 102a-102c. Each tool-specific call includes element-specific parameters extracted from the associated element 102a-102c and the content added to the associated element 102a-102c.

In some embodiments, each element 102a-102l can be associated with one or more tools 26a-26c. The integrated interface 50 is configured to extract tool-specific parameters for each tool 26a-26c associated with an element 102a-102l. For example, in some embodiments, a user interacts with element 102d, which is associated with a first tool 26a and a second tool 26b. For example, in some embodiments, the first tool 26a is configured to provide one or more components to the page 100 for presentation to a user, for example, from a database of stored content and the second tool 26b is configured to receive user selections and provide user selections to other pages or elements, such as a cart element, included in the page and/or network interface. It will be appreciated that any suitable tools can be associated with any suitable elements 102a-102l presented on the page. A user interacts with the third element 102d to updated one or more components or parameters of the third element, for example, one or more of a number of components displayed, size of displayed components, categories of displayed components, descriptions of displayed components, etc. The integrated interface 50 extracts a first set of tool-specific parameters from the third element 102d for the first tool 26a and a second set of tool-specific parameters for the second tool 26b. The integrated interface 50 generates a first tool-specific call to the first tool 26a including the first set of parameters and a second tool-specific call to the second tool 26b including the second set of parameters.

In some embodiments, the integrated interface page 100 includes an element 102e that is configured only as a container for one or more tools requiring configuration for the page 100. For example, in some embodiments, an element 102e is associated with a monitoring tool configured to monitor user interactions with a specific page 100. The monitoring tool does present any content and is not generally visible to a user interacting with the network interface. The integrated interface page 100 includes element 102e as a container for receiving parameters and/or configuration input for the monitoring tool. When a user provides input to element 102e, the integrated interface 50 extracts the relevant parameters and generates a tool-specific call for the monitoring tool to configure the monitoring tool based on the updated inputs.

In some embodiments, one or more of the elements 102a-102l include drag-and-drop functionality allowing a user to drag one or more components, predetermined element values, and/or other inputs into the elements 102a-102l. In some embodiments, a component can be commonly located with an element 102a-102l displayed on the page 100 to automatically position the component within to the commonly-located element 102a-102l. The integrated interface 50 is extract one or more tool-specific parameters from the applied component and generate one or more tool-specific calls for one or more tools associated with the commonly-located element 102a-102l. In some embodiments, the page 100 limits drag-and-drop functionality to a selected subset of elements 102a-102l.

Figure 4:
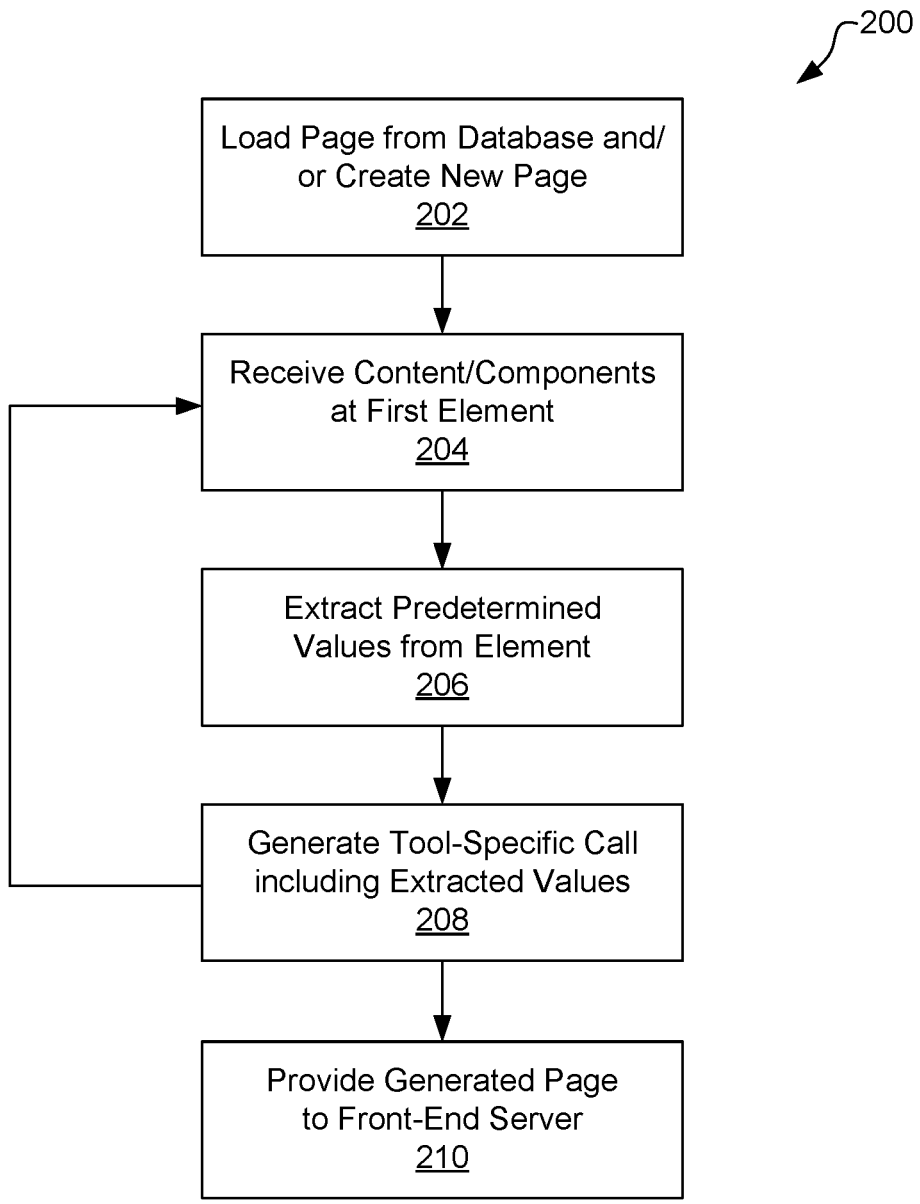
FIG. 4 is a flowchart illustrating a method of providing an integrated interface, in accordance with some embodiments.

FIG. 4 is a flowchart illustrating a method 200 of providing an integrated interface 50, in accordance with some embodiments. At step 202, an integrated interface 50 loads a page from an existing template, existing interface, and/or presents a blank page. The existing templates and/or existing interfaces can be loaded from a database in signal communication with the interface implementation system 24. In some embodiments, the existing templates and/or the existing interfaces include a predetermined set of elements 102a-102l and associated tools 26a-26c.

At step 204, a user interacts with a selected element 102a to provide content, parameters, components, and/or other input to the element 102a. In some embodiments, input can be provided by drag-and-drop functionality allowing a user to drag one or more components into a common location corresponding to the selected element 102a and automatically add the component to a page 100. In some embodiments, each element 102a-102l provides an interactive field configured to display components and/or tool input previously associated with the element 102a-102l. A user may interface with the field defined by the element 102a-102l to add, modify, delete, and/or otherwise interact with presented components. The input may be limited by the integrated interface 50 to a predetermined set of inputs appropriate for one or more tools associated with the selected element 102a.

At step 206, the integrated interface 50 extracts one or more tool-specific parameters from the element 102a and/or the components added to the element 102a. For example, in some embodiments, the integrated interface 50 extracts a file path for one or more files (such as a graphic, video, etc.) inserted into the element 102a, extracts text values or input values from the element 102a, extracts inherent values such as size, shape, color, etc. of the element 102a, and/or any other suitable parameters. In some embodiments, the parameters are defined by the one or more tools 26a-26c associated with the element 102. For example, if a first tool 26a and a second tool 26b are each associated with the selected element 102a, the integrated interface 50 extracts a first set of parameters defined by the first tool 26a and a second set of parameters defined by the second tool 26b. The extracted values can be related to the content added to the element 102a, the element 102a itself, the page 100, and/or an overall environment including the page 100.

At step 208, after extracting the tool-specific parameters from the selected element 102a at step 206, the integrated interface 50 generates a tool-specific call for each tool 26a-26c associated with the selected element 102a. For example, in some embodiments, a first tool 26a is associated with the first element 102a. For example, if the first tool requires a file path for uploading an inserted file to a server, the integrated interface 50 is configured to automatically extract a file path of a file inserted into the selected element 102a and provide a tool-specific call to the first tool 26a including the extracted file path. It will be appreciated that the integrated interface 50 can extract any suitable parameters and generate any suitable tool-specific call for any tool associated with the selected element 102a.

After completing the tool-specific call, the integrated interface 50 proceeds to step 204 to receive additional content and/or components from a user. After receiving all content/components, the method 200 proceeds to step 210 and provides the generated page 100 to a server, such as the front-end system 22, for presentation to one or more user devices 30a, 30b.

Figure 5:
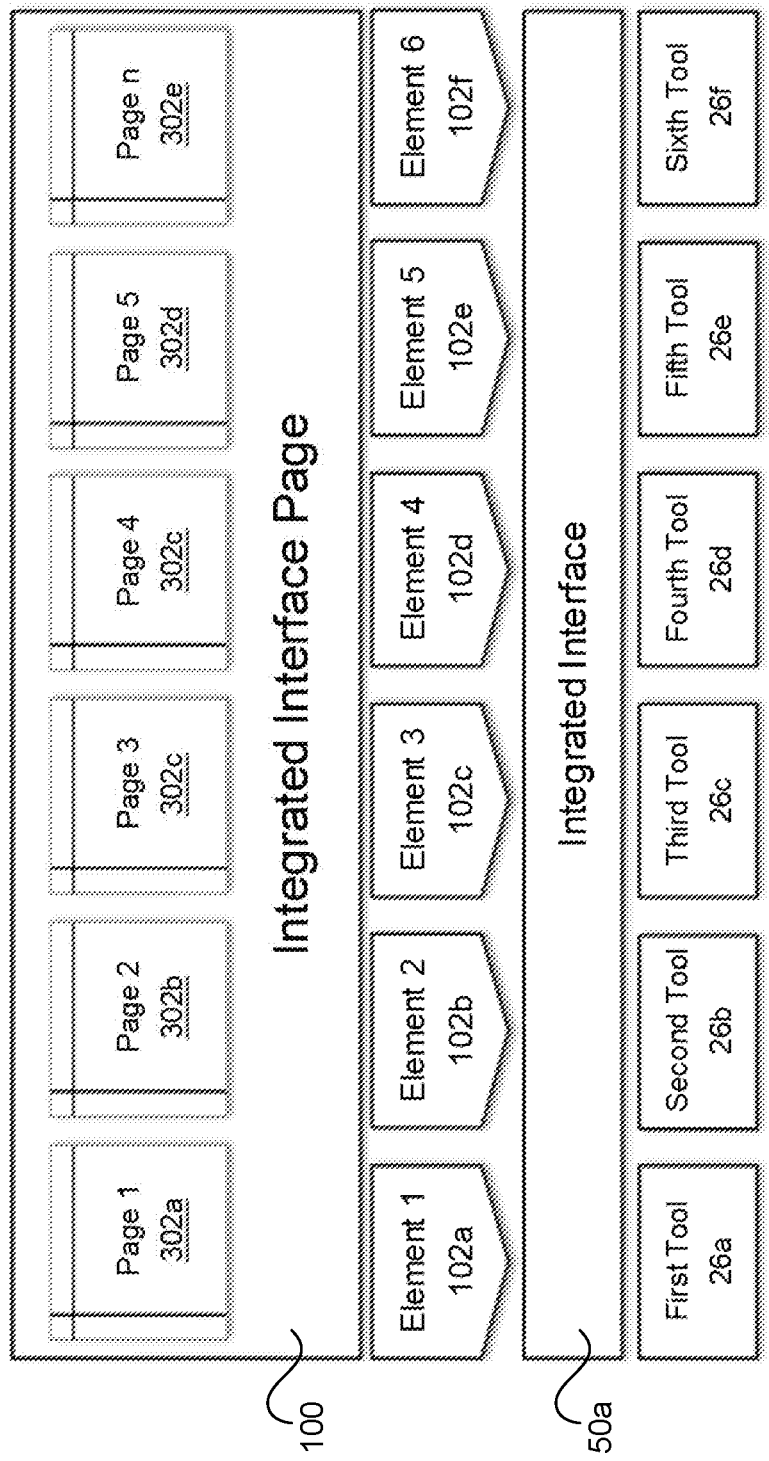
FIG. 5 illustrates a process flow for generating a user interface using the integrated interface page illustrated in FIG. 3, in accordance with some embodiments.

FIG. 5 illustrates a process flow 300 for generating one or more pages 100 using an integrated interface 50. Each of a plurality of pages 302a-302f can be presented as an integrated interface page 100. Each page 302a-302f includes a plurality of elements 102a-102f. Each of the elements 102a-102f is configured to interact with the integrated interface

50a to extract tool-specific parameters from each of the elements 102a-102f and provide tool-specific specific calls to one or more tools 26a-26f maintained by a tool system 28 (and/or multiple tool systems).

Figure 6:
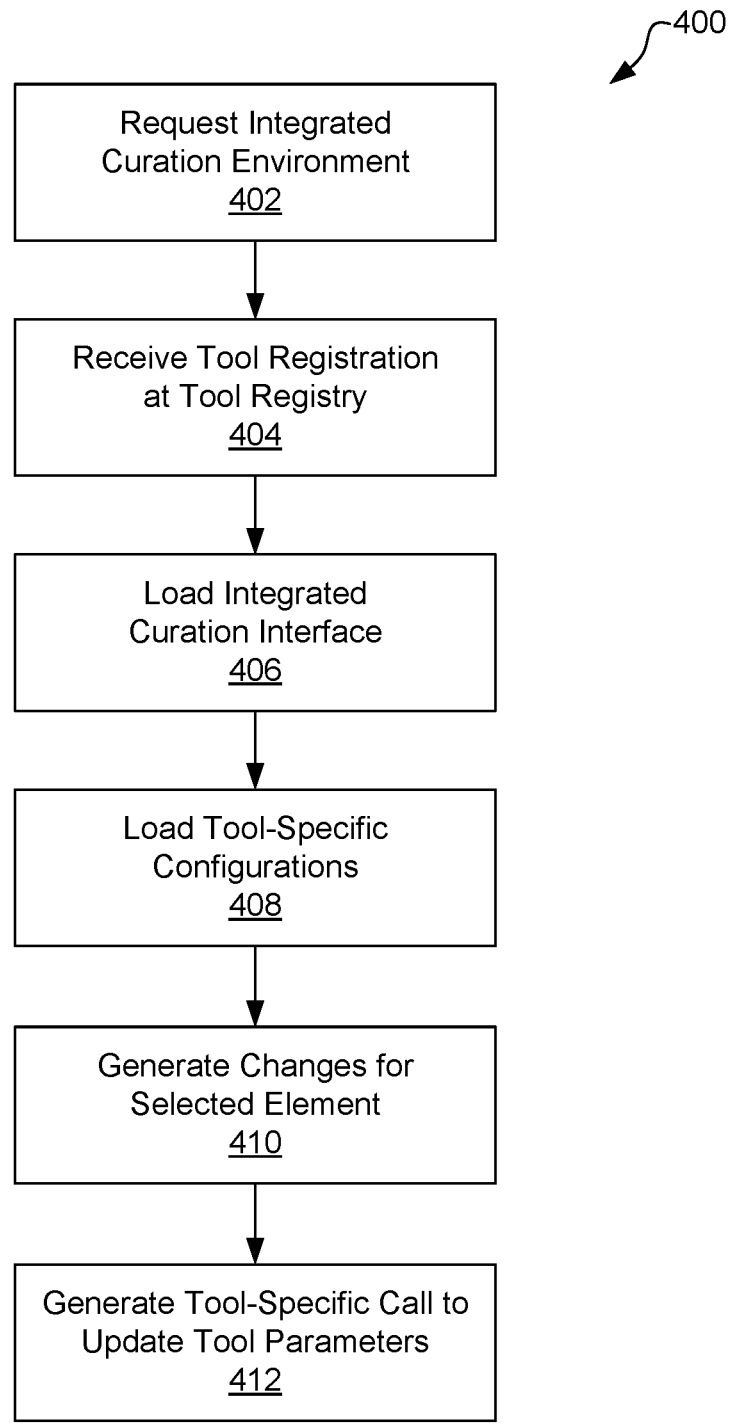
FIG. 6 is a flowchart illustrating a method of generating an integrated page using an integrated interface, in accordance with some embodiments.
Figure 7:
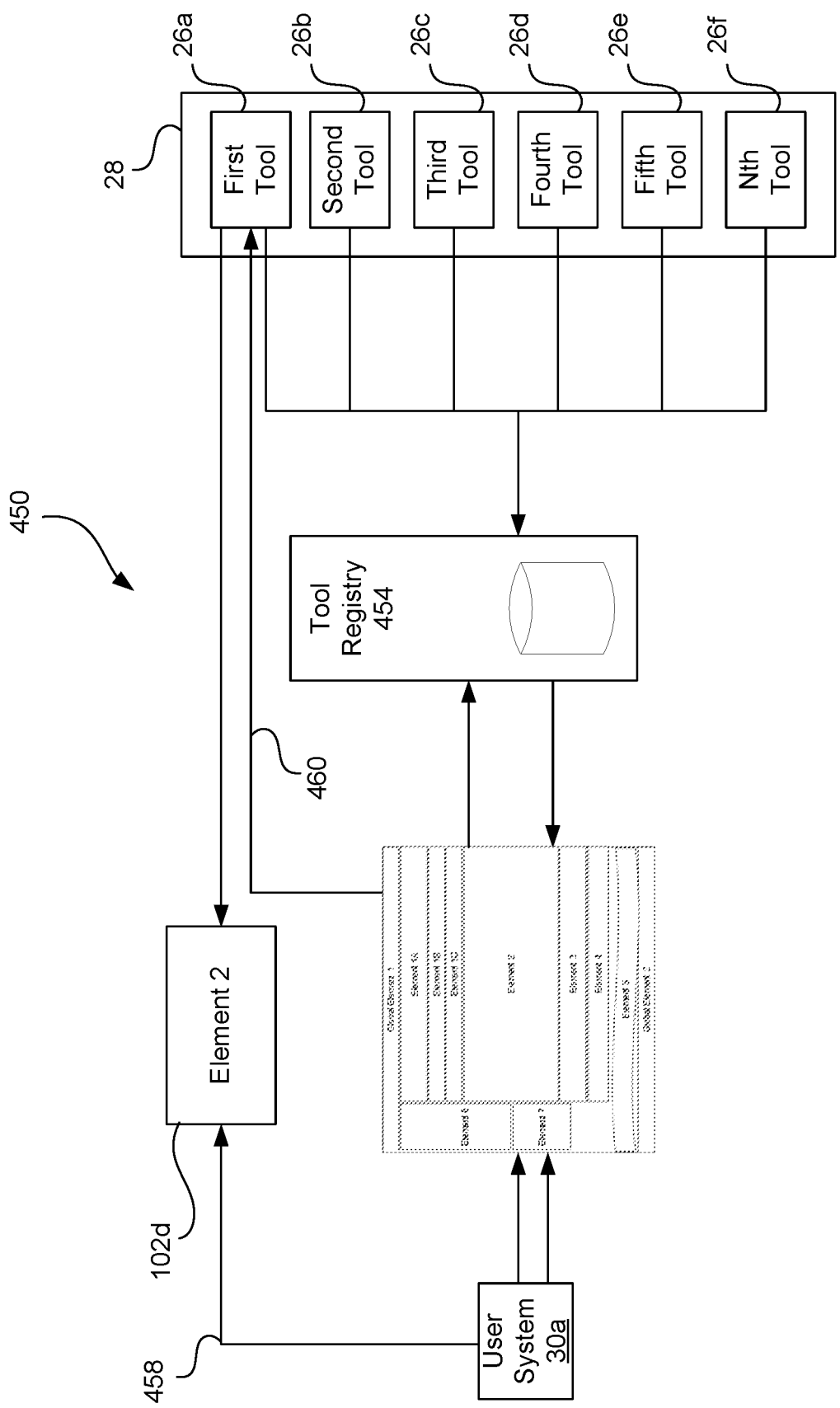
FIG. 7 is a process flow showing various components of a network environment during the method of FIG. 6, in accordance with some embodiments.

FIG. 6 is a flowchart illustrating a process 400 of generating a page using an integrated interface 50 and FIG. 7 illustrates a process flow 450 for one or more elements of the network environment 20 during execution of the method 400, in accordance with some embodiments. At step 402, a user device 30a interacts with an integrated interface 50 from one or more systems, such as the integrated interface system 24. The user device 30a can be a local system and/or a remote system with respect to the integrated interface system 24. The user device 30a can request a specific page maintained by the integrated interface 50 and/or all pages related to a selected network interface.

At step 404, the integrated interface system 24 executes a tool registry 454 to receive tool registrations from one or more tools 26a-26f implemented by a tool system 28. When a tool 26a-26f is registered with the tool registry 454, the tool identifies one or more elements 102a-102l included on a page 100 that are associated with the tool 26a-26f. In some embodiments, each tool 26a-26f registers as one or more tool types, such as, for example, a resource configured to change one or more elements 102a-102l, a renderable configured to show and/or render one or more objects, a hidden object, etc. Multiple tools 26a-26f can be registered to the same elements 102a-102l and/or as the same type in the tool registry 454. In some embodiments, the tool registry 454 includes one or more parameters identifying information to be extracted from elements 102a-102l for implementation and/or activation of a tool 26a-26f. Each tool 26a-26f identifies one or more parameters (or parameter definitions) at registration. The provided parameter definitions identify the parameters to be extracted from each element associated with the tool 26a-26f and included in tool-specific calls generated by the integrated interface 50. Although the tool registry step 404 is illustrated as occurring after step 402, it will be appreciated that step 404 can occur prior to, simultaneously with, and/or after step 402. It will be appreciated that step 404 can be executed multiple times to register additional and/or alternative tools prior to, simultaneously with, and/or after step 404.

At step 406, the integrated interface system 24 loads the integrated interface 50 including the requested integrated interface page 100. The integrated interface 50 loads elements and content including content provided by one or more tools associated with the elements in the tool registry 454. For example, in some embodiments, the page 100 includes one or more elements 102a-102l each having one or more tools 26a-26f registered therewith in the tool registry 454. The integrated interface 50 accesses the tool registry 454 to identify the necessary tools to implement each element 102a-102l included on the page 100.

At step 408, one or more registered tools, such as a first tool 26a are invoked to load one or more configurations and/or components presented in one or more elements, such as element 102d. For example, the first tool 26a can be registered as providing renderable content to the element 102d and the renderable content is loaded and presented in the integrated interface page 100. The one or more configurations can include display components, display behavior, response behavior, and/or any other component or configuration maintained by the first tool 26a and configured to be presented to a user.

At step 410, the user system 30a provides one or more changes 458 to a selected element of the page 100. For example, in some embodiments, a user system 30a selects an element 102d and identifies one or more components that should be changed, added, deleted, and/or otherwise updated. The user system 30a provides the one or more changes 458 to the element 102d as presented on the page 100. In some embodiments, the one or more changes 458 are provided through a drag-and-drop interface implemented by the integrated interface system 24, although it will be appreciated that any suitable interface can be provided.

At step 312, the integrated interface 50 generates a tool-specific call 460 to a first tool 26a associated with the selected element 102d. The tool-specific call 460 includes one or more parameters necessary to update and/or implement the tool 26a with respect to the components changed in the selected element 102d. The one or more parameters included in the tool-specific call 460 can be generated according to any of the methods discussed above. The first tool 26a updates the configurations and/or components maintained by the first tool 26a and associated with the selected element 102d.

The integrated interface 50 provides a single input for users to generate, modify, and/or otherwise curate pages in a network environment. By automatically extracting tool-specific parameters and generating tool-specific calls, the integrated interface 50 provides a single interface for generating, modifying, and updating a page without requiring a user to directly interact with each tool for each update or addition made to the page. The integrated interface 50 also provides a reduction in errors as tool-specific parameters are automatically extracted and provided to an associated tool, removing the possibility of user error during the configuration process.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A system, comprising:
   a non-transitory memory having instructions stored thereon, and a processor configured to read the instructions to:
   generate an integrated page including a first element associated with a first tool, wherein the first element is configured receive at least one of one or more configurable components configured to be presented on a generated page;
   receive a modification of the first element, wherein the modification of the first element is performed through the integrated page after the one or more components are presented on the integrated page;
   extract a first parameter from the first element, wherein the first parameter is defined by the first tool and the first parameter is related to the modification of the first element;
   generate a first tool-specific call for the first tool, wherein the first tool-specific call includes the first parameter, and wherein a structure of the first tool-specific call is defined by the first tool.

2. The system of claim 1, wherein the processor is further configured to:
receive a registration request from a second tool, wherein the registration request includes an element identifier associating the second tool with the first element and a parameter identifier identifying a second parameter of the first element; and
register the second tool with the page.

3. The system of claim 2, wherein the processor is further configured to:
extract the second parameter from the first element; and
generate a second tool-specific call to the second tool including the second parameter, wherein a structure of the second tool-specific call is defined by the second tool.

4. The system of claim 1, wherein the first tool is configured to modify one or more resources integrated in the interface page.

5. The system of claim 1, wherein the first tool is configured to present renderable components included in the interface page.

6. The system of claim 1, wherein the processor is further configured to:
receive a modification of a second element;
extract a second parameter from the second element; and
generate a second tool-specific call for a second tool, wherein the second tool-specific call includes the second parameter, and wherein a structure of the second tool-specific call is defined by the second tool.

7. The system of claim 1, wherein the first tool-specific call is to an application programming interface provided by the first tool.

8. A non-transitory computer readable medium having instructions stored thereon, wherein the instructions, when executed by a processor cause a device to perform operations comprising:
generating an integrated page including a first element associated with a first tool, wherein the first element is configured receive at least one of one or more configurable components configured to be presented on a generated page;
receiving a modification of the first element, wherein the modification of the first element is performed through the integrated page after the one or more components are presented on the integrated page;
extracting a first parameter from the first element, wherein the first parameter is defined by the first tool and the first parameter is related to the modification of the first element;
generating a first tool-specific call for the first tool, wherein the first tool-specific call includes the first parameter, and wherein a structure of the first tool-specific call is defined by the first tool.

9. The non-transitory computer readable medium of claim 8, wherein the processor causes the device to perform further operations comprising:
receiving a registration request from a second tool, wherein the registration request includes an element identifier associating the second tool with the first element and a parameter identifier identifying a second parameter of the first element; and
registering the second tool with the page.

10. The non-transitory computer readable medium of claim 9, wherein the processor causes the device to perform further operations comprising:
extracting the second parameter from the first element; and
generating a second tool-specific call to the second tool including the second parameter, wherein a structure of the second tool-specific call is defined by the second tool.

11. The non-transitory computer readable medium of claim 8, wherein the first tool is configured to modify one or more resources integrated in the interface page.

12. The non-transitory computer readable medium of claim 8, wherein the first tool is configured to present renderable components included in the interface page.

13. The non-transitory computer readable medium of claim 8, wherein the processor causes the device to perform further operations comprising:
receiving a modification of a second element;
extracting a second parameter from the second element; and
generating a second tool-specific call for a second tool, wherein the second tool-specific call includes the second parameter, and wherein a structure of the second tool-specific call is defined by the second tool.

14. The non-transitory computer readable medium of claim 8, wherein the first tool-specific call is to an application programming interface provided by the first tool.

15. A method, comprising:
generating an integrated page including a first element associated with a first tool, wherein the first element is configured receive at least one of one or more configurable components configured to be presented on a generated page;
receiving a modification of the first element, wherein the modification of the first element is performed through the integrated page after the one or more components are presented on the integrated page;
extracting a first parameter from the first element, wherein the first parameter is defined by the first tool and the first parameter is related to the modification of the first element;
generating a first tool-specific call for the first tool, wherein the first tool-specific call includes the first parameter, and wherein a structure of the first tool-specific call is defined by the first tool.

16. The method of claim 15, comprising:
receiving a registration request from a second tool, wherein the registration request includes an element identifier associating the second tool with the first element and a parameter identifier identifying a second parameter of the first element; and
registering the second tool with the page.

17. The method of claim 16, comprising:
extracting the second parameter from the first element; and
generating a second tool-specific call to the second tool including the second parameter, wherein a structure of the second tool-specific call is defined by the second tool.

18. The method of claim 15, wherein the first tool is configured to modify one or more resources integrated in the interface page.

19. The method of claim 15, wherein the first tool is configured to present renderable components included in the interface page.

20. The method of claim 15, comprising:
receiving a modification of a second element;
extracting a second parameter from the second element; and
generating a second tool-specific call for a second tool, wherein the second tool-specific call includes the second parameter, and wherein a structure of the second tool-specific call is defined by the second tool.

* * * * *